United States Patent [19]

Smith

[11] 4,062,299
[45] Dec. 13, 1977

[54] DEMOUNTABLE BAIT CUTTING TABLE

[76] Inventor: Anthony B. Smith, 3633 Highway 33, Neptune, N.J. 07753

[21] Appl. No.: 740,007

[22] Filed: Nov. 8, 1976

[51] Int. Cl.² .............................................. A47B 23/00
[52] U.S. Cl. ........................................ 108/42; 9/1.7; 248/159
[58] Field of Search ............... 108/150, 157, 152, 111, 108/159, 29, 42, 90, 32, 50, 59, 97, 101; 248/535, 538, 218.4, 159, 354 P; 182/187, 53; 403/378, 349; 9/1.7

[56] References Cited

U.S. PATENT DOCUMENTS

| 687,371 | 11/1901 | Dreisbach | 108/152 |
| 1,824,682 | 9/1931 | O'Neil | 248/159 X |
| 2,473,778 | 6/1949 | Benes | 9/1.7 X |
| 2,604,930 | 7/1952 | Dean et al. | 108/152 X |
| 2,952,432 | 9/1960 | Valdez | 248/538 X |
| 3,007,757 | 11/1961 | Tillery | 108/152 |
| 3,955,787 | 5/1976 | Brown | 248/159 |

FOREIGN PATENT DOCUMENTS

| 648,110 | 4/1964 | Canada | 108/156 |
| 99,435 | 2/1962 | Norway | 108/156 |
| 152,129 | 1/1932 | Switzerland | 9/1.7 |

Primary Examiner—James T. McCall
Attorney, Agent, or Firm—Bacon & Thomas

[57] ABSTRACT

A flat table is releasably mounted on a central depending leg at such an angle that the table is horizontal when the leg is placed in a slanted fishing rod socket on a boat, such sockets being normally provided for holding unattended fishing rods while trolling. A notch in the lower end of the leg engages a cross pin in the socket to prevent rotation of the leg in the socket and thus locks the table in horizontal position.

3 Claims, 5 Drawing Figures

U.S. Patent  Dec. 13, 1977  4,062,299
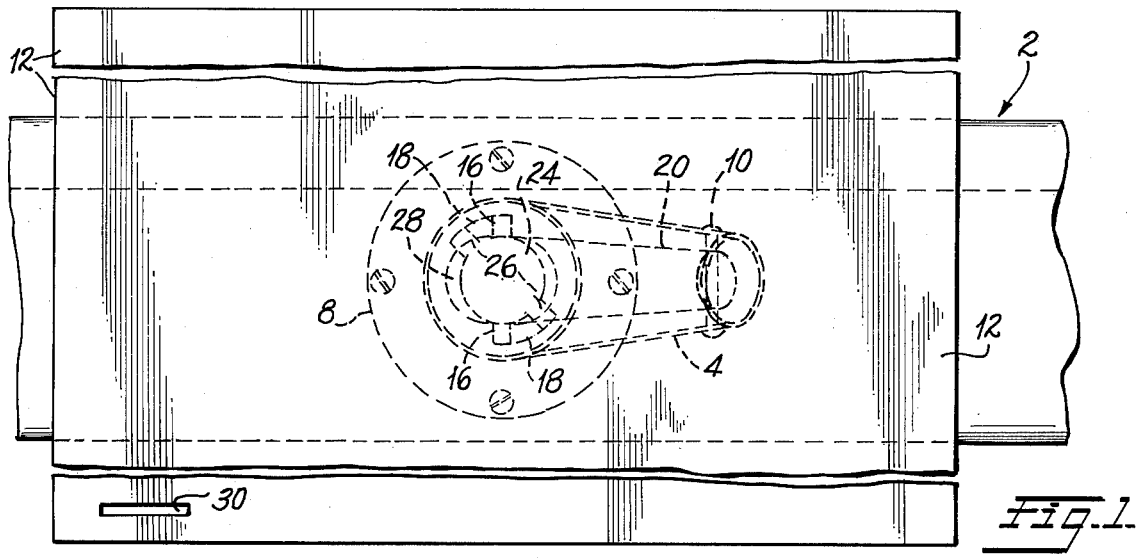
*Fig. 1.*
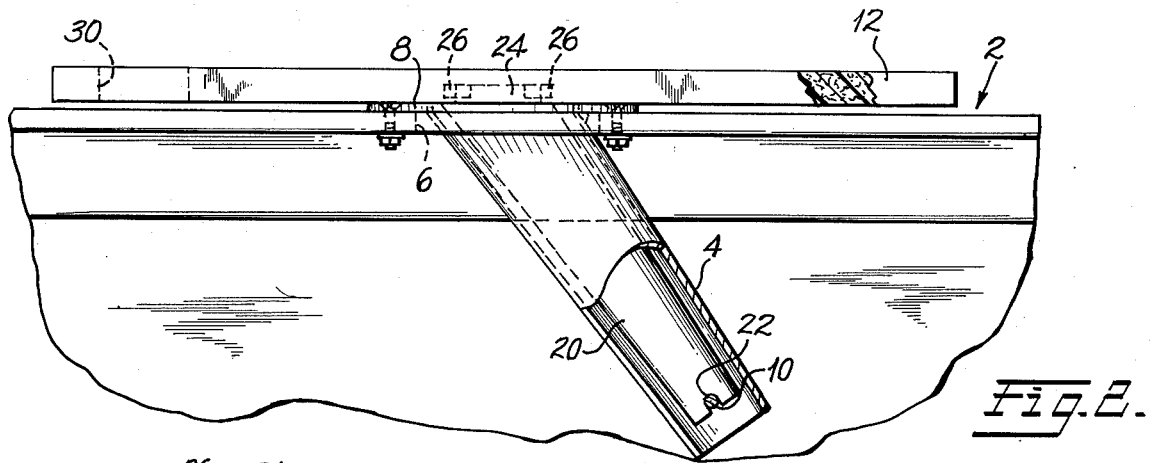
*Fig. 2.*
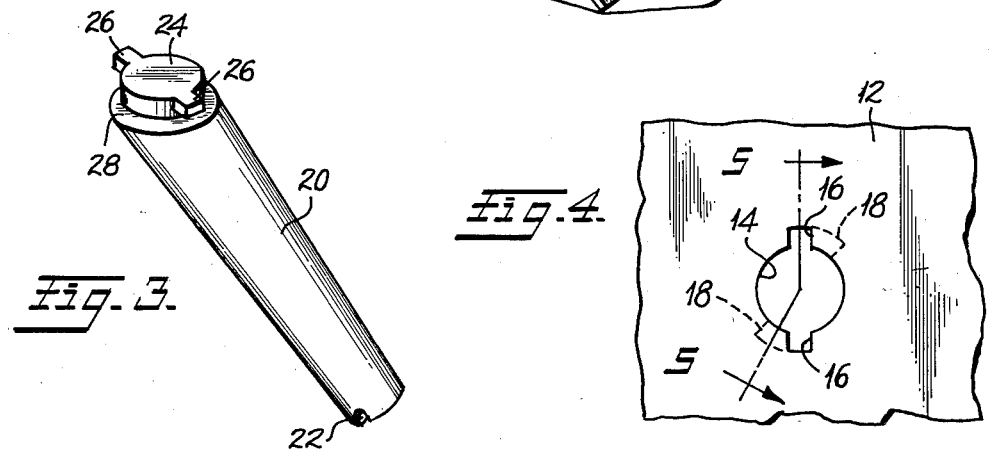
*Fig. 3.*  *Fig. 4.*
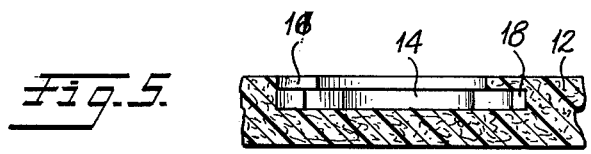
*Fig. 5.*

DEMOUNTABLE BAIT CUTTING TABLE

BACKGROUND OF THE INVENTION

This invention is in the field of demountable tables.

Boats used for fishing are desirably equipped with a table or board or the like for use in cutting bait or cleaning fish. The usual tables or boards are seldom in a convenient location or of a convenient height and are subject to unwanted displacement as the boat rolls or pitches. When conventional tables are used they are not readily stowed when not in use.

SUMMARY OF THE INVENTION

A principal object of the present invention is to provide a bait cutting table substantially impervious to water and comprising separate, easily stowed parts which can be readily assembled and mounted on means normally provided on fishing boats.

BRIEF DESCRIPTION OF THE DRAWINGS

FIG. 1 is a plan view of the invention mounted on the gunwale of a boat;

FIG. 2 is a side view, partly in section, of the structure shown in FIG. 1;

FIG. 3 is a perspective view of the table leg;

FIG. 4 is a fragmentary bottom view of the central portion of the flat table; and FIG. 5 is an enlarged sectional view taken on the line 5—5 of FIG. 4.

DESCRIPTION OF A PREFERRED EMBODIMENT

In the drawings, numeral 2 indicates the gunwale of a boat which may be of Fiberglas or the like and which is provided with a tubular member 4 extending through an opening 6 in the gunwale and downwardly at an oblique angle. The tubular member of socket 4 is provided with a flange 8 by which it is secured to the gunwale. A transverse pin 10 is fixed in and extends across the socket 4 near the bottom thereof. Such sockets are conventionally provided on boats used for fishing and serve to support a fishing rod. Such rods are usually provided with a notch at their end which notch engages with the pin 10 to hold the fishing rod against turning in the socket.

The present invention provides a bait cutting or fishing cleaning board or table adapted to be mounted in and held by the conventional socket 4 already provided in the boat.

The bait cutting table comprises a rectangular or square flat table member 12 preferably formed of Fiberglas or other suitable plastic material so that it may be easily cleaned, will not deteriorate upon weathering and which is sufficiently hard and firm to serve as a cutting board or table. At its center the table 12 is formed with a generally cylindrical socket 14, in its bottom surface, (see FIGS. 4 and 5) having radial extensions or slots 16 communicating with undercut grooves 18.

A table leg 20, which may likewise be molded of suitable plastic material, is dimensioned to fit within the socket 4 previously described and is provided with a notch 22 extending across its lower end and adapted to embrace the pin 10 to hold the leg in predetermined oriented postion within the socket 4. At its upper end the leg 20 is provided with a cylindrical boss 24 having radially extending ears 26 of a dimension to be received in the recesses 16 and undercut grooves 18 previously described. The boss 24 is of a size to readily enter the socket 14 in table 12. A shoulder 28 at the upper end of the leg 20 is arranged to abut the under surface of table 12 when the parts are assembled.

The table may be assembled to the leg 20 by positioning the boss 24 in recess 14 with the ears 26 entering the slots 16 in the table and the leg may then be rotated relative to the table to cause the ears 26 to enter the undercut notches 18. The parts are so dimensioned that a relatively tight frictional fit exists and the table 12 is in predetermined and fixed orientation relative to the leg 20. With the table and leg so assembled, the leg may be inserted into the socket 4 to the position shown in FIG. 2 wherein the leg and table are held against rotation in the socket. If the leg 20 were free to rotate in socket 4, the table 12 would be unstable and could then assume tilted positions other than the horizontal position illustrated.

Obviously, the leg 20 may be made of any desired length, for example, long enough to project a substantial distance above the upper end of socket 4 to thus position the table 12 at a higher elevation than that shown.

During fishing, the table may be used for cutting bait, cleaning fish or for any desired purpose and it is to be noted that the outer edge thereof extends outwardly of the side of the boat so that waste material may be scraped off the table into the water without soiling any part of the boat itself.

As shown, the table 12 is provided with a slot 30 adapted to receive a knife blade when the latter is not in use. Obviously, any number of such slots may be positioned wherever desired on the table. When it is desired to remove the bait cutting table from the socket 4, that may be readily done by simply lifting upwardly to remove the leg 20 from the socket. Thereafter, the leg 20 may be removed from the table top 12 to facilitate storing the device without occupying an undue amount of space on the boat.

While a single specific embodiment of the invention has been shown and described, it is to be understood that other forms may fall within the scope of the appended claims.

I claim:

1. In combination:
   an elongated socket member fixed to a support having a generally horizontal surface to extend downwardly from said surface at an oblique angle;
   a table leg in said socket and extending upwardly therefrom;
   interengaging means on said leg and socket holding said leg in fixed orientation in said socket; and
   a flat table member having its central portion removably secured to the upper end of said leg in predetermined orientation thereto and at such an angle thereto that said table member lies in a substantially horizontal place generally parallel to and adjacent said surface.

2. The combination defined in claim 1 wherein said leg is slidably removable from said socket.

3. The combination defined in claim 1 wherein said interengaging means comprises a pin extending across said socket near the bottom thereof and a notch extending across the lower end of said leg and embracing said pin.

* * * * *